Nov. 2, 1926.
G. F. MINNIS
ANCHOR FOR SAFETY BELTS
Filed Jan. 6, 1926
1,605,757
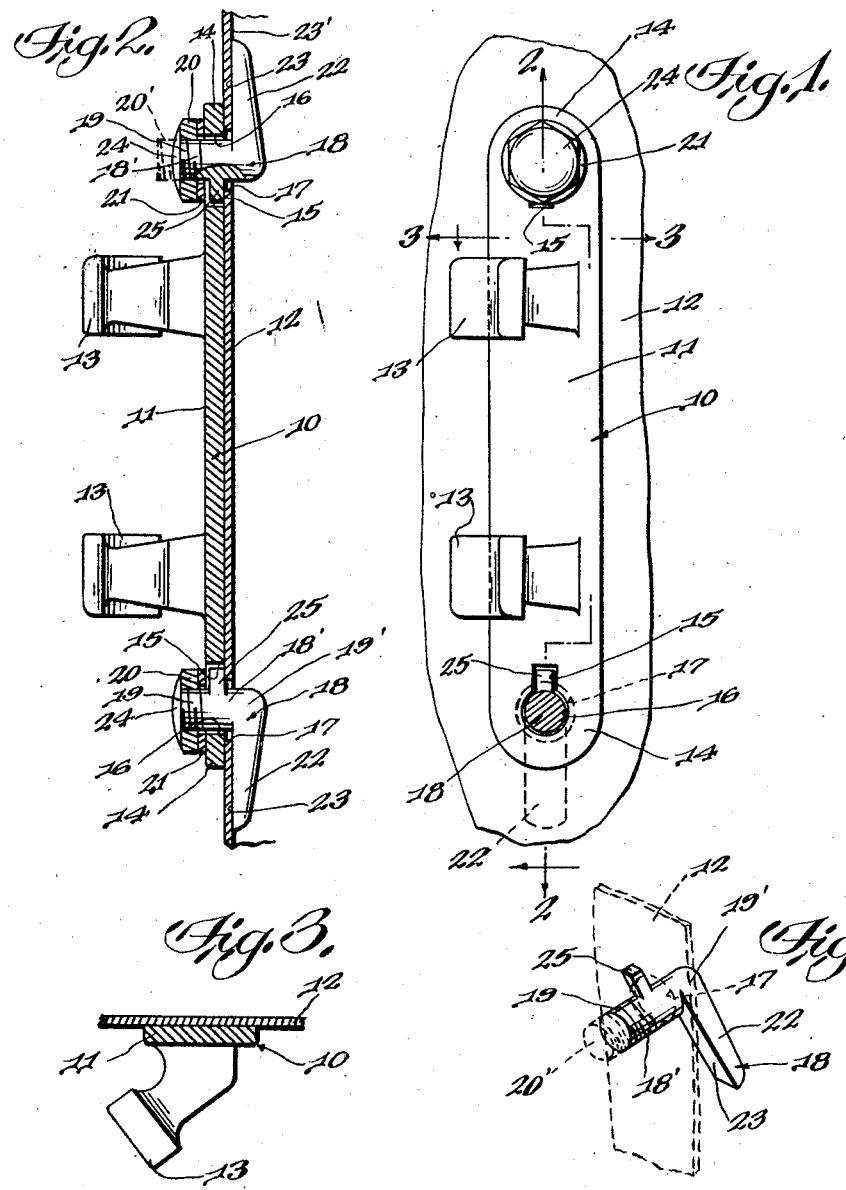
George F. Minnis
INVENTOR
BY Victor J. Evans
ATTORNEY Patented Nov. 2, 1926.

1,605,757

UNITED STATES PATENT OFFICE.

GEORGE F. MINNIS, OF CHICAGO, ILLINOIS.

ANCHOR FOR SAFETY BELTS.

Application filed January 6, 1926. Serial No. 79,672.

This invention relates to certain novel improvements in anchors for window washers' safety belts and more especially to the construction and arrangement of parts for securing the anchors to a hollow or solid metal window casing, and has for its principal object the production of a device of this character wherein the securing elements can be expeditiously associated with the anchor regardless of the thickness of the metal of the window casing.

Among the salient objects of the invention is the production of a device of this character wherein provision is made to prevent the securing elements of the anchor from completely passing through apertures formed in a hollow metal window casing through which inserted and find lodgement in a confined position where the same cannot be removed or recovered, and wherein this provision further serves to prevent turning of the securing elements when operated upon for effecting secured connection and to assure alignment of the anchor with respect to the sides of the window casing.

A still further object of the invention is the production of a device of this character wherein the securing elements of the anchor have inserting ends permitting expeditious insertion through apertures in a window casing and which are capable of serving in a capacity cooperating with other parts of the securing elements to assure a safely secured connection between the anchor and the window casing.

Other objects will appear hereinafter.

The invention consists in the novel arrangement and combination of parts to be hereinafter described and claimed.

The invention will be best understood by reference to the accompanying drawings showing the preferred form of construction of the invention and in which:

Fig. 1 is an elevational view of the invention in its preferred form of construction, Fig. 2 is a sectional detail view of the same taken substantially on line 2—2 of Fig. 1, Fig. 3 is a sectional detail view of the same taken substantially on line 3—3 of Fig. 1, and Fig. 4 is a perspective view of one of the securing bolts embodied in the invention.

The conventional window washers' safety belt anchor now commercially in use includes as a part of its construction a body adapted for bearing engagement with the surface of a window casing and is provided with spaced anchor studs having head portions of various designs arranged and adapted to receive the securing hook of the safety belt.

These anchors are ordinarily fixed to the casing by means of rivets or screws which necessitate, in most cases, assembly before complete installation of the window casing. This arises to a decisive disadvantage when it is necessary or required to renew the anchor or to assemble the anchor after the installation of the window casing. It is therefore an object of the invention to overcome these disadvantageous features and to this end I have devised a novel and inexpensive securing arrangement permitting assembly of the anchor to a window casing after installation as well as before or in fact at any time, when found necessary.

To accomplish this object I provide the usual anchor 10 including a body portion 11 adapted for bearing engagement with a window casing 12 and provided with opposite anchor studs 13 for the usual purpose known in the art.

This body portion has formed therein adjacent each end 14 thereof a receiving slot 15 opening into an insertion hole 16. This insertion hole 16 is adapted for registration with an aperture 17 formed in the window casing in the proper place.

A securing bolt 18 is adapted for insertion through the hole 16 and aperture 17 in a manner hereinafter described. This securing bolt includes a shank portion 18' having a threaded end portion 19 for the reception of a nut 20 threaded thereon to bear against the lock washer 21 disposed on the shank between the end of the body 11 of the anchor 10 and the nut 20. The insertion end 19' of the securing bolt 18 has an angled end 22 provided with a flat bearing surface 23 for bearing engagement with the inside surfaces 23' of the window casing 12 when the nut 20 is operated upon to effect secured connection.

As stated herein, one of the objects of the invention is to provide a securing element adapted for expeditious use regardless of the thickness of the metal of the window casing. To this end I propose to manufacture the shank portion 18' of the securing bolt of a length sufficient to accommodate the various thicknesses of metal. In doing this it is apparent that after the nut 20 is threaded on the shank 18' as far as will permit there will be a considerable portion of the shank portion extending outwardly from the nut. This portion, indicated in dotted lines at 20', is cut off leaving a sufficient amount of stock to form a rivet head 24 which prevents displacement of the nut. This outwardly extending shank portion will of course vary according to the thickness of the metal of the window casing.

In accomplishing other objects of the invention I provide a laterally extending lug 25 formed as an integral part of the securing bolt 18 on the shank portion 18' thereof forwardly and in opposite direction of the angled end 22 and adapted for bearing engagement with the outer surfaces of the window casing adjacent the opening 17. In one capacity this lug serves to retain the securing bolt against rotation when the nut 20 is operated upon. In this capacity the lug 25 is confined in the slot 15 as best illustrated in Fig. 1. This lug serves further to assure parallel alignment between the window casing jam and the anchor 10. This results from the fact that the slot 15 is formed in a longitudinal direction with respect to the body 11 of the anchor 10. One of the advantages resulting from this lug resides in the fact that the lug serves to prevent complete passage of the securing bolt through the aperture 17, to find lodgement within the window casing jam in a confined position where the same cannot be removed. This results from the fact that the lug is of such proportion and configuration making it impossible to pass completely through the aperture 17. It will be manifest from inspection of Fig. 4 of the drawing that the lug extending laterally from the shank portion 18' forwardly and in opposite direction of the angled end 22 obstructs complete passage of the securing bolt when the bolt is inserted to adjust its angled end 22 in bearing engagement with the inside surfaces of the window casing jam.

For safety purposes, it is intended that each anchor 10 be equipped with two similar securing elements 18, however, it is apparent that the number and size of the securing elements will be governed by the size and shape of the anchor.

While I have shown and described the preferred form of my invention, it will be apparent that various changes and alterations may be carried out during manufacture without departing from the spirit of the invention or the scope of the appended claims.

The invention having thus been set forth, what I claim as new and useful is:

1. In combination with a window casing having an aperture formed therein and an anchor positioned in bearing relation with the window casing and having an opening formed therein and a slot extending from the opening, a securing element having an end portion insertable through the opening and the aperture, means associated with the securing element and confined in the slot retaining the securing element against rotation and limiting passage thereof through the aperture, and retaining means carried by the securing element opposite the inserted end.

2. In combination with a window casing having an aperture formed therein and an anchor positioned in bearing relation with the window casing and having an opening formed therein and a slot extending from the opening, a securing element having an end portion insertable through the opening and the aperture and provided with a bearing surface at said end in bearing engagement with the window casing, means associated with the securing element and confined in the slot retaining the securing element against rotation and limiting passage thereof through the aperture, and retaining means carried by the securing element opposite the inserted end.

3. In combination with a window casing having an aperture formed therein and an anchor positioned in bearing relation with the window casing and having an opening formed therein and a slot extending from the opening, a securing element having a portion confined in the slot and a portion insertable through the aperture with a portion in bearing relation with the inside surface of the window casing.

4. In combination with a window casing having an aperture formed therein and an anchor positioned in bearing relation with the window casing and having an opening formed therein and a slot extending from the opening, a securing element having a portion confined in the slot and a portion insertable through the aperture with a portion in bearing relation with the inside surface of the window casing, said bearing portion being inwardly of the first mentioned portion and extending in opposite direction thereto.

5. Attaching means of the class described including a securing element having a nut-receiving shank portion and having an angled end portion providing a bearing surface and a laterally extending portion forwardly of the bearing portion and extending in opposite direction thereto.

6. Attaching means of the class described including a securing element having a threaded shank portion and provided with a bearing portion and having a laterally extending portion formed on the shank portion forwardly of the bearing portion.

7. Attaching means of the class described including a securing element having a threaded shank portion and provided with a bearing portion and having a laterally extending portion formed on the shank portion forwardly of the bearing portion, and a threaded member for threaded engagement with the threaded shank portion.

8. An article of the class described including anchor studs, a bearing plate carrying the studs and having openings formed therein and slots extending from the openings for the reception of securing members.

9. An article of the class described including anchor studs, a bearing plate carrying the studs and having openings formed therein and slots extending from the openings, and means for securing the plate to a structural unit, said means including portions confined in the openings and in the slots extending from the openings.

10. An article of the class described including an anchor plate having openings formed therein and slots extending from the openings, and means for securing the plate to a structural unit, said means including portions confined in the openings and in the slots extending from the openings.

In testimony whereof I affix my signature.

GEORGE F. MINNIS.